Feb. 3, 1970  D. J. WAYFIELD  3,492,965
PROPULSION SYSTEM AND RELATED DEVICES
Filed June 12, 1961  5 Sheets-Sheet 1

INVENTOR
DAVID J. WAYFIELD

FIG. 5
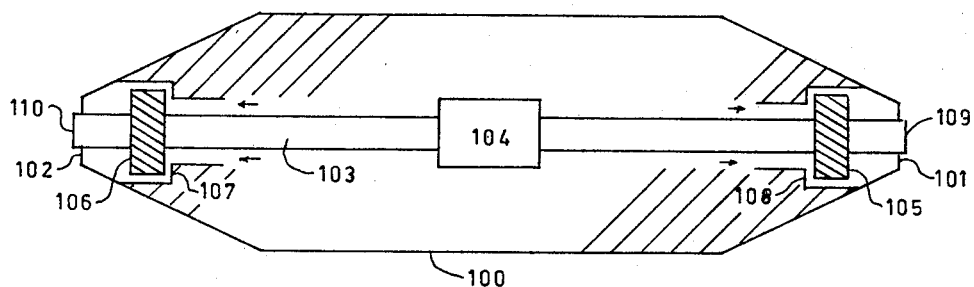
FIG. 7  FIG. 6
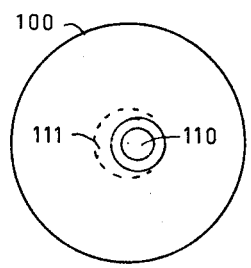 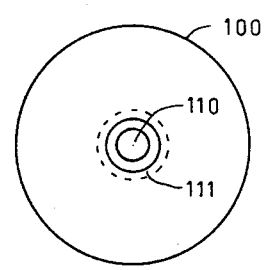
FIG. 8
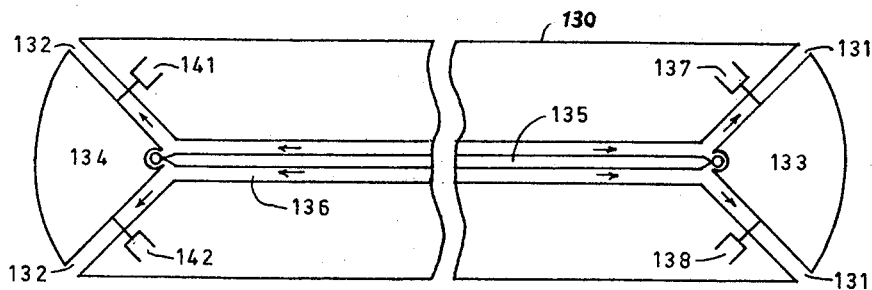
FIG. 10  FIG. 9
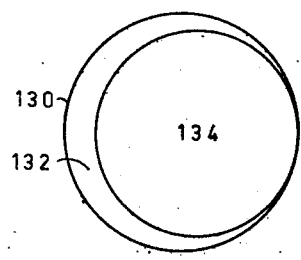 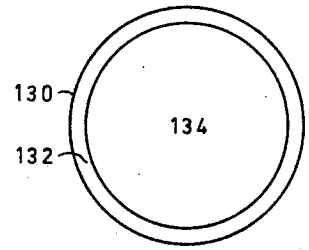
INVENTOR
DAVID J. WAYFIELD

INVENTOR
DAVID J. WAYFIELD

INVENTOR
DAVID J. WAYFIELD

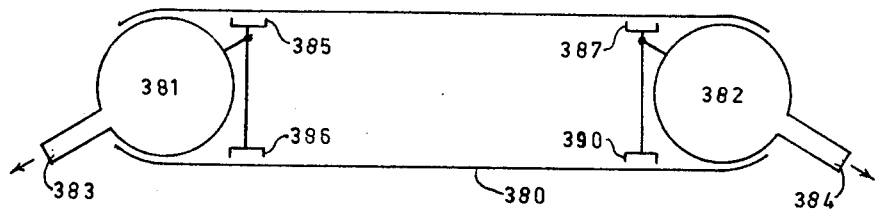
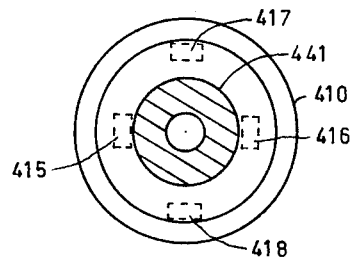
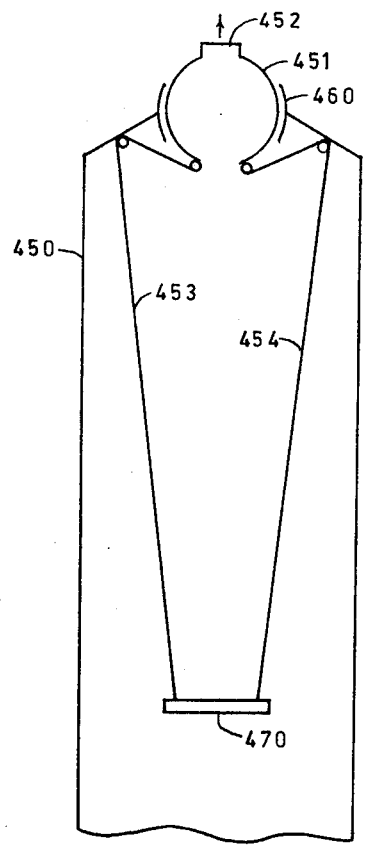
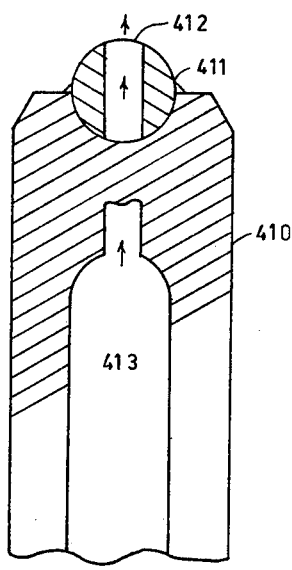

United States Patent Office 3,492,965
Patented Feb. 3, 1970

3,492,965
PROPULSION SYSTEM AND RELATED DEVICES
David J. Wayfield, West Islip, N.Y.
(Rte. 1, New Park, Pa. 17352)
Filed June 12, 1961, Ser. No. 116,371
Int. Cl. B63h 11/10, 25/46; B64c 15/06
U.S. Cl. 115—12                9 Claims This invention relates to a simplified and more reliable way of maneuvering fluid-discharging vehicles in various mediums: water atmosphere, space and combinations of these mediums.

It is an immediate improvement of Link's Patent No. 2,963,543, an underwater vehicle which is maneuvered by eight fluid jets. One of the embodiments of my invention will show how Link's vehicle can be improved by using only two fluid jets and consequently a simplified control system. Each of these two jets are "steered" or deflected by an annular valve (or rim, ring, disc, needle, cone, etc.); the valves are moved by various actuators which include electromagnetic means, control jets, etc.

The many objects of the present invention include those set forth in the above-mentioned Link patent, namely:

(1) It is therefore a primary object of the present invention to provide a hermetically sealed submersible housing for mounting image-transmitting apparatus which has improved and more flexible propulsion and control means.

(2) It is another object of the present invention to provide improved propulsion and control means for a submersible housing such that its heading may be changed without modifying its geographical position, attitude and depth.

(3) It is a further object of the present invention to provide propulsion and control means for a submersible housing such that its attitude may be changed without modifying its geographical position, heading and depth.

(4) It is still another object of the present invention to provide an improved propulsion and control means for a submersible housing such that its depth may be changed without modifying its geographical position, heading and attitude.

(5) It is another object of the present invention to provide an improved propulsion and control means for a submersible housing which may be moved laterally in geographical position without modifying its depth, heading and attitude.

(6) It is a further object of the present invention to accomplish the above objects in mediums other than water, including atmosphere space, and combined mediums.

Other objects and advantages of this invention will further become apparent hereinafter and in the drawings, in which:

FIG. 5 is a view in cross section of another vehicle embodying this invention;

FIG. 6 is a view of one end of the vehicle in FIG. 5;

FIG. 7 shows an operational view of the same end of the vehicle in FIG. 5;

FIG. 8 is a view in side elevation of another vehicle embodying this invention;

FIG. 9 is a view of one end of the vehicle in FIG. 8;

FIG. 10 shows an operational view of the same end of the vehicle in FIG. 8;

FIG. 21 is a view in cross section of another vehicle embodying this invention;

FIG. 22 is a view in cross section of one end of another vehicle embodying this invention;

FIG. 23 is a view of the vehicle in FIG. 22;

FIG. 24 is a view in cross section of one end of still another vehicle embodying this invention.

Figure 1:
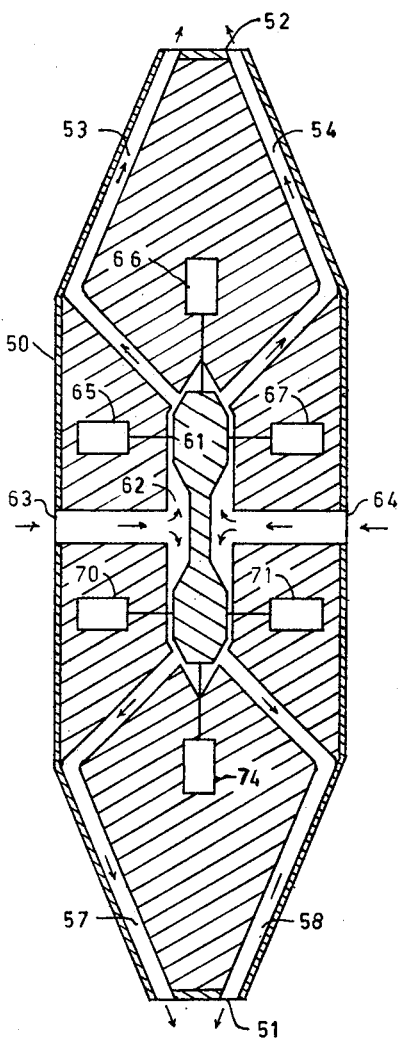
FIG. 1 is a view in cross section of a vehicle constructed in accordance with this invention with parts broken away in order to illustrate important details.

In describing the preferred embodiments of the invention illustarted in the drawings, specific terminology will be resorted to for the sake of clarity. However, it is not intended to be limited to the specific terms so selected and it is to be understood that each specific term includes all technical equivalents which operate in a similar manner to accomplish a similar purpose.

Turning now to a specific embodiment of the invention selected for illustration in the drawings, FIG. 1 designates generally a torpedo-shaped vehicle. Fluid is drawn into power chamber 62 by way of inlets 63 and 64. Valve 61 is shown centrally suspended in power chamber 62 and is used to determine from which of the eight outlets (four of which are shown) the power fluid in the power chamber is permitted to escape and in what proportion for the purpose of steering the vehicle. As shown in the drawing, the power fluid is escaping equally through all the outlets, i.e. valve 61 is centrally suspended within power chamber 62. Valve 61 is movable along 3 axes by linear actuators 65–74. Actuators 68 and 69 are not shown or designated in this drawing, but would be at right angles to actuators 65 and 67, and in the same plane; actuators 72 and 73 are also not shown but are at right angles to and in the same plane as actuators 70 and 71.

When linear actuator 66 is fully extended while linear actuator 74 is withdrawn, the gas or power fluid will escape from nozzle exhaust 52, causing the vehicle to move in the opposite direction of the exhaust. The vehicle can thus be steered upwardly, downwardly, to the left, to the right and/or combinations of these directions by means of actuators. It will be apparent then that the direction of movement may be at right angles to the longitudinal axis of said vehicle.

Figure 2:
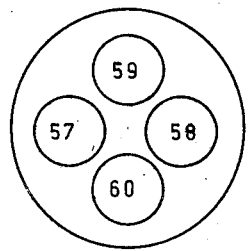
FIG. 2 is a much enlarged view of one end of the vehicle.

FIG. 2 shows the four exhaust nozzles 57–60 which comprise the end of the vehicle, 51 in FIG. 1. It will be seen that the conduits 57 and 58 transmit respectively the power fluid through the nozzles in FIG. 2 which are also labeled 57 and 58. When nozzles 57 to 60 are "firing" equally (and only from this end of the vehicle), the vehicle will move in a straight line. Thus the steering of the vehicle in multiple directions will depend on the unequal "firing" from these nozzles.

Figure 3:
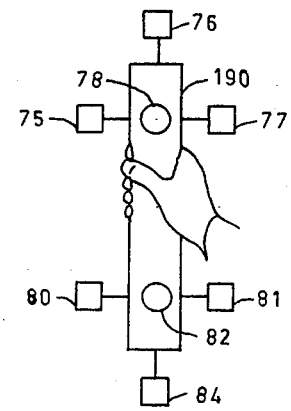
FIG. 3 is a 3-axis hand control stick for controlling the vehicle shown in FIG. 1.

FIG. 3 shows a hand control stick which corresponds to valve 61, the latter of course corresponding generally to the position of the vehicle 50 of FIG. 1. This hand stick "floats" or is positioned equidistantly from ten linear actuators 75–84. (The actuators 79 and 83 are not shown but 79 is opposite to and in the same plane as 78; actuator 83 is opposite to and in the same plane as 82.) All these actuators in FIG. 3 may be mated with the corresponding actuators in FIG. 1 by hydraulic, pneumatic, mechanical, electric, and/or combinations of means. For example, actuators 76 and 84 are respectively connected (though not shown) to actuators 66 and 74, 75 with 65, etc. These actuators are connected so that the operator of the hand control stick that controls the vehicle can move said vehicle in any direction by moving the control stick in the desired direction of travel.

Figure 4:
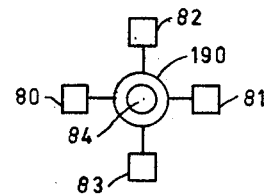
FIG. 4 is an end view of FIG. 3.

FIG. 4 shows the bottom view of FIG. 3. Actuator 83 is shown in FIG. 4 but not in FIG. 3.

FIG. 5 shows a vehicle 100 which is similar to vehicle 50 in FIG. 1 in that it discharges a power fluid from both ends of said vehicle. Valve stick 103 extends throughout the craft and within the power chamber and is movable at cam block 104 in either a forward or rearward direction. Since cam block 104 is in its central position, the power fluid is permitted to discharge equally from orifices 101 and 102. When cam block 104 is moved so as to permit valve block 105 to engage valve seat 108, the fluid discharge will be through the opposite end of the vehicle, i.e. through orifice 102.

FIG. 6 shows valve stick terminal 110 and annular valve 111, recessed in the housing of vehicle 100. This annular valve may be flat, concave or convex depending on the housing. Its purpose is to deflect the power fluid that escapes from the annular orifice 102 which lies between terminal 110 and valve 111. FIG. 7 shows how valve 111 blocks orifice 102. (The valve 111 is moved by 3 or 4 linear actuators which are not here shown.)

FIG. 8 shows another vehicle 130 having cone-shaped exhaust jets through circular orifices 131 and 132. Steering of the vehicle is accomplished by cone-shaped deflectors or valves 133 and 134. FIGS. 8, 9 and 10 show how valve 134 is pivoted within the orifice 132 by linear actuators 141, 142 and one or more actuators not shown. Connecting rod 135 is movable along the length of the vehicle by means not shown.

Figure 11:
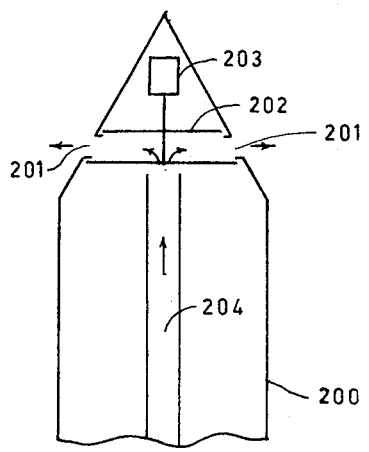
FIG. 11 is a view in cross section of one end of another vehicle embodying this invention.
Figure 12:
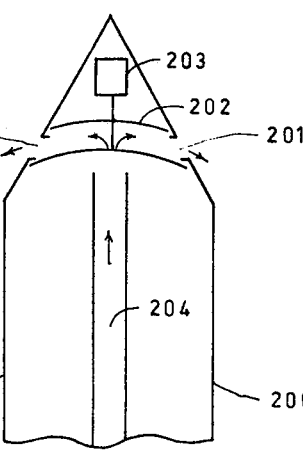
FIG. 12 is an operational view of the vehicle shown in FIG. 11.
Figure 13:
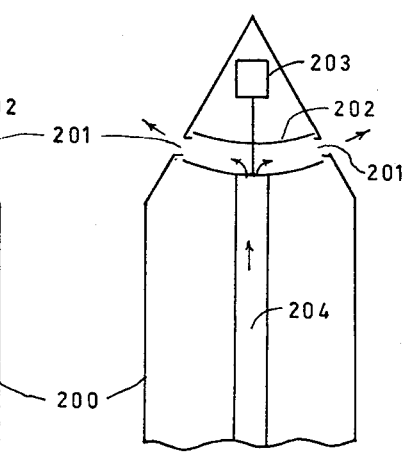
FIG. 13 is another operational view of the same vehicle shown in FIG. 11.

FIGS. 11, 12 and 13 represent one end of a vehicle of which the opposite end is similarly constructed. Linear actuator 203 is attached to spaced deflectors 202. A power fluid from conduit 204 enters between spaced deflectors through holes (not shown) situated near the center of the lower half of the spaced deflectors and escapes through annular orifice 201. When actuator 203 pulls deflectors 202, said deflectors form a concave position as in FIG. 12 causing a backward-moving, cone-shaped jet from annular orifice 201. When actuator 203 is extended, the deflectors 202 assume a convex position, thus producing a forward-moving, cone-shaped jet through orifice 201. Deflectors 202 may be made of spring steel or of overlapping spokes made of flat steel. It is understood that an annular valve for blocking the fluid discharge at any point of the orifice may or may not be used.

Figure 14:
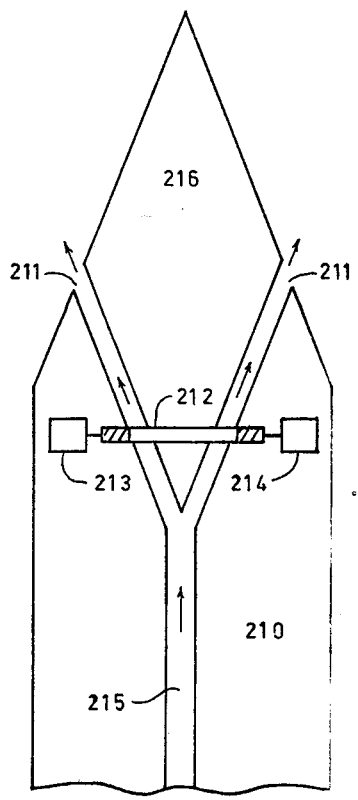
FIG. 14 is a view in cross section of one end of another vehicle embodying this invention.

FIG. 14 shows one end of a vehicle or craft having an annular orifice 211, an annular deflector or valve 212, linear actuators 213 and 214 (and one or more others not shown) for deflecting the power fluid about orifice 211 as it comes from conduit 215. The diamond-shaped nose 216 may be drawn (by linear actuators) towards body 210 of said vehicle causing orifice 211 to be completely closed.

Figure 15:
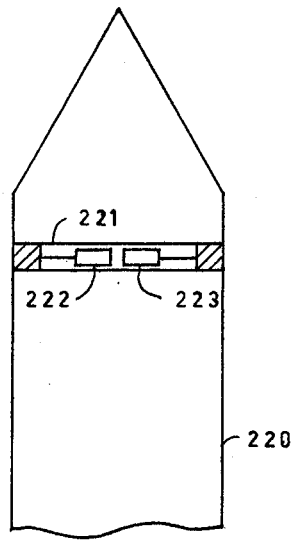
FIG. 15 is a view in cross section of one end of another vehicle embodying this invention.

FIG. 15 shows one end of a vehicle 220 with an annular valve 221 having its outer circumference flush with the external housing of said vehicle. Valve 221 is movable outside of this housing by linear actuators 222, 223 and one or more actuators not shown which lie in the same plane as valve 221 and are equidistant from each other.

Thus valve 212 in FIG. 14 and valve 221 in FIG. 15 serve basically the same function: to deflect a fluid being thrust against said valves so that resultant force of a jet can be concentrated at any desired point in a particular plane. Valve 212 deflects the power fluid released by the vehicle in which it is housed and valve 221 deflects the ambient fluid in which the vehicle moves.

Figure 16:
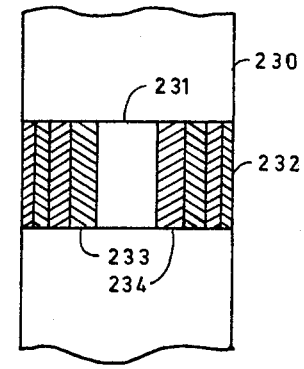
FIG. 16 is a view in side elevation of another vehicle embodying this invention.

In FIG. 16, we see a section of a craft 230 having a series of rollers 232 tightly encircling said craft but forming an orifice 231 when rollers 233 and 234 are separated. These rollers can be separated by mechanical or other means at any point in the plane shown to permit the escape of a gas as a reactive force for steering said craft.

Figure 17:
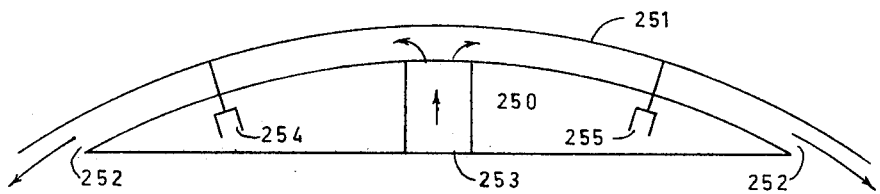
FIG. 17 is a view in cross section of another vehicle embodying this invention.

FIG. 17 shows a circular craft 250 having a pivoting roof or deflecting valve 251 for deflecting a power fluid from 253 by way of cone-shaped orifice 252. This deflecting is accomplished by actuators 254 and 255 and others not shown.

Figure 18:
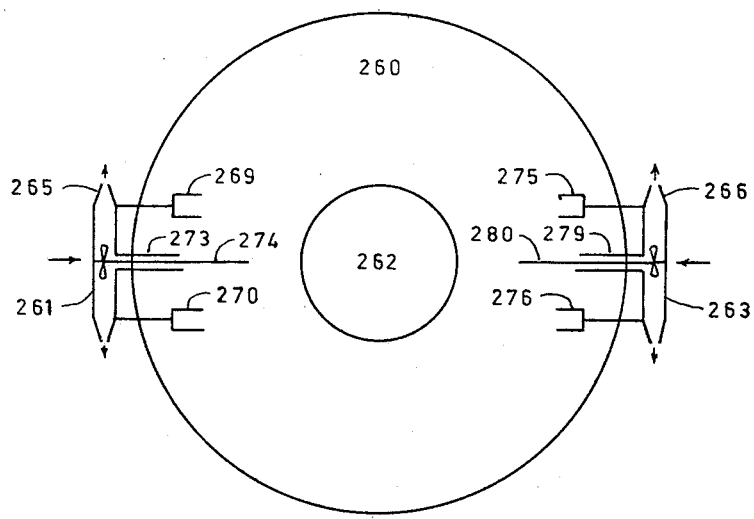
FIG. 18 is a view in cross section of another vehicle embodying this invention.

FIG. 18 shows a globular underwater vehicle 260 having at least two annular valves 265 and 266 at opposite sides of the vehicle. A propeller attached to power-driven rod 274, pulls water through slots in stationary disc 261, producing a radial jet from between disc 261 and annular disc valve 265. Since valve 265 is controlled by linear actuators 267 and 270 (and one or more others), the radial jet can be reduced in its intensity at any point while increased in intensity at an opposite point, said point being opposite by 180 degrees. Thus by merely "steering" valves 265 and 266, an operator can move the vehicle forward, rearward, to the left, to the right, upward, downward, or combinations of these directions.

Figure 19:
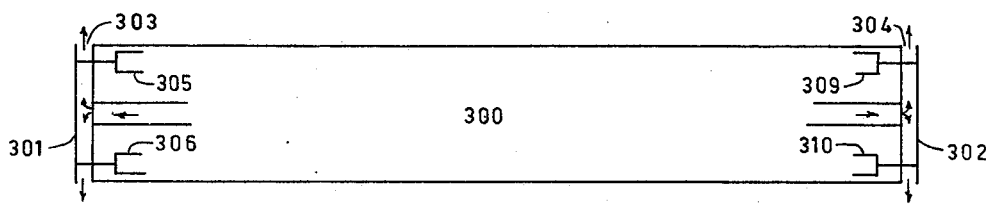
FIG. 19 is a view in cross section of another vehicle embodying this invention.

FIG. 19 represents a cylindrical vessel or craft 300 having annular valves 301 and 302 for deflecting a power fluid originating from within said craft and escaping respectively from annular orifices 303 and 304. Valve 301 is movable by actuators 305, 306 and one or more others; valve 302 is movable by actuators 309, 310 and one or more others.

Figure 20:
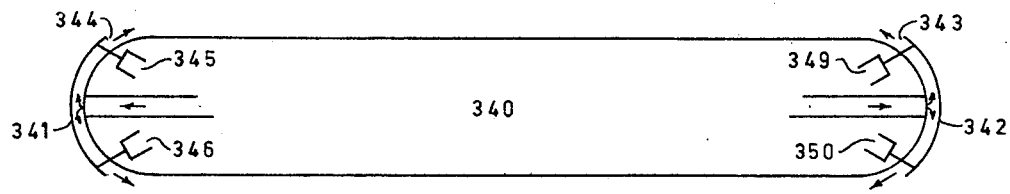
FIG. 20 is a view in cross section of another vehicle embodying this invention.

Cylindrical vehicle 340 in FIG. 20 operates similarly to vehicle 300 in FIG. 19 except that annular valves 341 and 342 are concave and produce cone-shaped jets. Valve 341 is movable by actuators 345, 346 and one or more others; valve 342 is movable by actuators 349, 350 and one or more others.

In FIGS. 21–24, we see various forms of vehicles having at opposite ends of said vehicles, identical fluid-discharging nozzles or valves which resemble turret guns. When valves 381 and 382 in FIG. 21 are tilted by multiple actuators 385, 386, 387, 390 (and others) so that orifices 383 and 384 point downward, vehicle 380 will rise. Valves 381 and 382 release a fluid under pressure.

In FIGS. 22 and 23, valve 411 with orifice 412 is movable about one axis by gimbals or motors 415 and 416 and about a second axis at right angles to the first by gimbals or motors 417 and 418. Duct 413 provides a passage means for conducting the propulsion fluid to valve 411.

In FIG. 24, valve 451 having an annular orifice 452 is steered by hand-controlled steering wheel 470 by connecting means 453 and 454 and one or more other means not shown. Connecting means 453 may be electrical, mechanical, hydraulic, pneumatic, etc.

In operation, this invention may or may not be used in conjunction with wings, vanes, ballast and other conventional devices depending on the medium in which the vehicles are to operate and the purposes for which they are constructed. One hand of the operator on the control stick will be sufficient to steer the craft or vehicle in any direction. By using annular valves that can "float" and/or "touch down" at any point around an annular orifice, we can concentrate the resultant force of a normally radial jet at any radius, or the main or resultant force of the normally conical jet at any point of the cone. The power amplifying means between the linear actuators of the hand control stick and the annular valves of the craft, permit the operator to "feel" the movement of the craft while exerting only a small force with the hand. It is to be understood that the annular valves of this invention may utilize conventional isometric hand controls, X–Y potentiometer joysticks, track balls, etc.

The advantages of this invention are numerous and include economy in construction and simplicity and effectiveness in use. A pilot can easily make a fast landing on an area the size of his vehicle, thus no landing field is necessary, only a parking area. When the pilot approaches his parking area, he causes the fluid power or compressed gas to escape from the nose of the vehicle in a braking action. When stationary, or almost stationary, he causes his conical jets from each end of his vehicle to discharge equal amounts of gas so that he neither moves forward or rearward; at the same time he will cause these conical jets to be more intense downward than upward, sufficiently to overcome gravity, thus permitting him to hover while examining his landing area. He may then land slowly by force of gravity or by an upward discharge of the jets followed by the braking action of the downward jets just before landing. Since the control stick will be positioned parallel to the longitudinal axis of the craft, the pilot merely has to move the stick where he wants his vehicle to move. The uniqueness and simplicity of this invention permits the use of various embodiments of this invention in various mediums: water, atmosphere, space, and combinations of these mediums. It can readily be used as a programmed missile or drone to quickly elude enemy fire, or to attract enemy fire and photograph enemy positions, etc.

It is to be understood that the forms of the invention herewith shown and described are to be taken as preferred embodiments. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention. Accordingly, it is to be understood that the terms, "cones," "rims" and "valve means" as used herewith have numerous equivalents such as "deflectors," "annular valves," and the like. Also, the terms "actuators" or "linear actuators" have such equivalents as "electromagnetic means," "control jets" and the like.

The word "depth" has such equivalents as "height" or "altitude." The word "submersible" as used to describe various embodiments of this invention does not imply that said embodiments are limited to a liquid environment.

I claim:
1. A submersible housing, a reaction type propulsion means comprising two nozzles at opposite ends of said housing with their orifices aimed oppositely to each other; two deflecting cones, one centered in each orifice; six actuators, three holding and positioning each of said cones and, means for operating said actuators to control said nozzles in a manner such that the submersible housing may be oriented as to either position, depth, heading or attitude.

2. In a diving bell, drive means for propelling said bell in a plurality of directions, said drive means comprising a propellor positioned between two rims, 3 actuators for moving one of said rims relative to the other of said rims which is stationary, for drawing the ambient fluid through holes in the center of said stationary rim and propelling same in a direction opposite to the desired direction of travel.

3. A diving bell as in claim 2 wherein the movable rim is positioned by magnetic means.

4. A diving bell as stated in claim 2 but equipped with an additional assembly of rims, actuators, and propellor positioned at the opposite end of said bell for greater maneuverability.

5. A submersible housing having a television camera fixedly mounted therein, propulsion means comprising two nozzles at opposite ends of said housing with their orifices aimed oppositely to each other, a deflecting cone centered in each orifice, three actuators for holding and positioning each of said cones, and means for operating said actuators to control said nozzles in a manner such that the submersible housing may be oriented as to either position, depth or heading.

6. In a submarine vessel, drive means for propelling said vessel in a plurality of directions, said drive means comprising two nozzles whose orifices are aimed oppositely to each other, means contained by said vessel for placing a fluid under pressure, conduit means connecting said fluid pressure means and said nozzles, two fluid-deflecting rims, one positioned around each nozzle, linear actuators for controlling said rims such that the reactive force created by said nozzles permits the navigation of said vessel in any direction.

7. In a submarine vessel as in claim 6 wherein said rims are positioned by magnetic means.

8. A submarine vessel as in claim 6 wherein the linear actuators are controlled by a man-operated control stick such that when the stick is moved in any particular direction, the vessel is moved in the same direction.

9. A submersible housing, a reaction-type propulsion means, including fluid pressure producing means, multiple nozzles at opposite ends of said housing with their orifices aimed oppositely to each other, conduit means connected between said nozzles and said fluid pressure producing means, valve means within said propulsion means, six actuators for controlling said valve means for orienting said housing as to either, position, depth, heading or attitude.

References Cited
UNITED STATES PATENTS

| | | | |
|---|---|---|---|
| 2,330,674 | 9/1943 | Briggs | 114—51 |
| 2,974,907 | 3/1961 | Eggers | 244—52 |
| 2,461,347 | 2/1949 | Pentecost | 244—4 |
| 3,021,095 | 2/1962 | Moore | 244—4 |
| 2,395,435 | 2/1946 | Thompson | 244—52 |
| 2,465,457 | 3/1949 | Johnston | 244—52 |
| 2,613,497 | 10/1952 | MacDonald | 60—35.6 |
| 2,921,435 | 1/1960 | Landgraf | 60—35.54 |
| 1,178,739 | 4/1916 | McIntyre | 114—16 |
| 1,296,816 | 3/1919 | Krecioch | 114—16 |

FOREIGN PATENTS

| | | |
|---|---|---|
| 122,869 | 2/1919 | Great Britain. |

MILTON BUCHLER, Primary Examiner

JAMES E. PITTENGER, Assistant Examiner

U.S. Cl. X.R.

114—16, 151; 115—14; 244—52; 61—69